(12) United States Patent
Navarro Sorroche et al.

(10) Patent No.: US 10,634,811 B2
(45) Date of Patent: Apr. 28, 2020

(54) DOWNHOLE NEUTRON GENERATORS AND METHODS TO GENERATE NEUTRONS IN A DOWNHOLE ENVIRONMENT

(71) Applicant: Halliburton Energy Services, Inc., Houston, TX (US)

(72) Inventors: Juan Navarro Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 15/566,184

(22) PCT Filed: Dec. 21, 2016

(86) PCT No.: PCT/US2016/068104
§ 371 (c)(1),
(2) Date: Oct. 12, 2017

(87) PCT Pub. No.: WO2018/118053
PCT Pub. Date: Jun. 28, 2018

(65) Prior Publication Data
US 2018/0329109 A1 Nov. 15, 2018

(51) Int. Cl.
*G01V 5/10* (2006.01)
*H05H 6/00* (2006.01)
*H05H 3/06* (2006.01)

(52) U.S. Cl.
CPC .............. *G01V 5/10* (2013.01); *H05H 3/06* (2013.01); *H05H 6/00* (2013.01)

(58) Field of Classification Search
CPC ................... G01V 5/10; H05H 3/06
(Continued)

(56) References Cited

U.S. PATENT DOCUMENTS

| 4,996,017 A | 2/1991 | Ethridge |
| 2009/0135982 A1 | 5/2009 | Groves |

(Continued)

FOREIGN PATENT DOCUMENTS

| SU | 457406 A1 * | 4/1980 |
| WO | 2013084004 A1 | 6/2013 |

OTHER PUBLICATIONS

English Derwent of SU 457406A (Year: 1980).*
International Search Report and Written Opinion dated Sep. 8, 2017, International PCT Application No. PCT/US2016/068104.

*Primary Examiner* — David P Porta
*Assistant Examiner* — Abra S Fein
(74) *Attorney, Agent, or Firm* — McGuireWoods LLP (57) ABSTRACT

The disclosed embodiments include downhole neutron generators and methods to utilize downhole neutron generators in a downhole environment. In one embodiment, a downhole neutron generator includes a heating element to dissipate heat to a first transition metal, which heats up the first transition metal and facilitates the first transition metal to absorb deuterium and tritium gases flowing proximate said transition metal. The downhole neutron generator also includes a second transition metal separated from the target foil, where the second transition metal is doped with of deuterium and the tritium ions, and a laser to direct optical pulses onto a surface of the first transition metal to produce deuterium and the tritium ions from the absorbed deuterium and tritium, where said ions traverse through a back surface of the first transition metal to the second transition metal to interact with the doped deuterium and the tritium ions to initiate fusion reaction.

20 Claims, 4 Drawing Sheets

(58) Field of Classification Search
USPC .................................................... 250/269.1
See application file for complete search history.

(56) References Cited

U.S. PATENT DOCUMENTS

| | | |
|---|---|---|
| 2011/0261919 A1 | 10/2011 | Sefcik et al. |
| 2012/0307950 A1 | 12/2012 | Sekine et al. |
| 2013/0064339 A1 | 3/2013 | Miley et al. |
| 2014/0086376 A1 | 3/2014 | Perkins |
| 2016/0035440 A1* | 2/2016 | Navarro-Sorroche ... G21G 4/02 376/151 |

* cited by examiner

DOWNHOLE NEUTRON GENERATORS AND METHODS TO GENERATE NEUTRONS IN A DOWNHOLE ENVIRONMENT

BACKGROUND

The present disclosure relates generally to downhole neutron generators, methods to generate neutrons in a downhole environment, and methods to log formation data.

Oil and gas companies often utilize different logging techniques to obtain a record of petrophysical properties of a formation, such as, but not limited to, formation resistivity, formation anisotropy, dip angle of formation bed, radioactivity of the formation, formation density, formation porosity, acoustic properties of the formation, and formation pressure properties as well as other properties of the formation (collectively referred to as "formation properties"). For example, in wireline logging, a logging tool is attached to a wireline and is lowered into a borehole. The logging tool contains various sensor components used to obtain the formation properties. Data corresponding to the measurements may be recorded in real time mode or in memory mode.

Some conventional logging tools utilize always-on, radioactive chemical sources that generate energetic particles, such as neutrons and gamma-rays that interact with the surrounding formation, and utilize sensors to detect resulting signals indicative of the formation properties of the surrounding formation. However, many of the chemical sources are hazardous to the downhole environment. Other logging tools utilize pulsed neutron generators to generate neutrons that interact with the surrounding formation. The logging tools also utilize sensors to detect resulting signals indicative of the properties of the surrounding formation.

Certain types of neutron generators utilize penning discharge ion sources, which include permanent magnets or solenoids to initiate ionization of deuterium and tritium gas in an ionization chamber or an ion source. However, magnetic properties deteriorate at operational temperatures of the neutron generators. Further, solenoids require additional electrical connections and circuitry, which complicate the design and increases the cost of the neutron generators.

Other types of neutron generators utilize electron impact ionization as well as direct field ionization techniques to initiate ionization of deuterium and trillium gases. However common designs of neutron generators that utilize the foregoing techniques also utilizes an Ultra High voltage ("UHV") section to accelerate deuterium and trillium ions. The UHV unit is often housed in a cavity having an outer diameter of approximately 1½ inches and a length of approximately 5 feet. In a downhole environment, the length of the UHV unit significantly increases the size, complexity, and cost of the neutron generators. Further, it may not be feasible to deploy the UHV in an annulus of a production casing or a wellbore due to the dimensions of the UHV.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to downhole neutron generators, methods to generate neutrons in a downhole environment, and methods to log formation data. In some embodiments, the downhole neutron generator includes a target foil positioned in a housing of the downhole neutron generator, and having a first transition metal layer deposited along a back surface of the target foil. In one of such embodiments, the target foil is a Mylar backing and a first transition metal layer is deposited along the back surface of the Mylar backing. In another one of such embodiments, the target foil is an aluminum backing and the first transition metal layer is deposited along the back surface of the aluminum backing. In a further one of such embodiments, the target foil is formed from a different backing material, and the first transition metal layer is deposited along the back surface of said backing material. As defined herein, a front surface is a surface that faces toward a direction of an incoming laser beam ("optical pulses") and/or ions, whereas a back surface is a surface that faces away from a direction of incoming optical pulses and/or ions. As such, the front surface of the target foil faces the incoming optical pulses, whereas the back surface of the first transition metal layer faces away from the incoming optical pulses.

The downhole neutron generator also includes a heating element deployed proximate to the first transition metal layer such that heat generated from the heating element transfers to the first transition metal layer and heats up the first transition metal layer. In some embodiments, the heating element is wrapped around the first transition metal layer. The first transition metal layer is operable to absorb an amount of deuterium and/or tritium gases that are released into the housing when the temperature of the first transition metal layer is above a threshold temperature. For example, if the first transition metal layer is titanium, the titanium may absorb an amount of deuterium and/or tritium gases when the titanium reaches a temperature of approximately around 800° C. In some embodiments, the amount of deuterium and/or tritium gases that may be absorbed by the first transition metal layer is based on Sieverts' relation, which may be expressed as the following:

$$P = A \cdot Q^2 \cdot e^{-\frac{E}{RT}} \qquad \text{EQ. 1}$$

where P is the equilibrium pressure, A is a constant, Q is the concentration, E is the absorption energy, R is the gas constant, and T is the threshold temperature. For a Titanium-Hydrogen system that utilizes titanium as the first transition metal, the equation above may be expressed as log P=3.9616+2 log Q−5287/T. For a Zirconium-Hydrogen alloy system that utilizes zirconium as the transition metal, the foregoing Sievert's relation may be expressed as log P=4.8+2 log Q−6116/T. The downhole neutron generator also includes a second transition metal layer that is doped with deuterium D+ and/or tritium T+ ions. Further, the second transition metal layer is positioned further away from the laser source relative to the first transition metal layer. In some embodiments, the second transition metal layer is also formed from titanium, and is coupled to a heatsink that is operable to absorb heat generated from one or more fusion reactions that occur at or proximate to the second transition metal layer.

The downhole neutron generator also includes a laser system, such as a Chirped Pulse Amplification ("CPA") type laser system that is operable to direct a focused beam of optical pulses onto the front surface of the target foil, where the beam of optical pulses pierces the target foil to interact with the front surface of the first transition metal layer that is deposited along the back surface of the target foil. More particularly, the laser system includes a laser source that is operable and oriented to generate optical pulses and project the generated optical pulses toward the housing. In some embodiments, the generated optical pulses are transmitted directly through a window of the housing to the front surface of the target foil. In other embodiments, the laser system includes one or more mirrors, reflectors, and/or similar components that are operable to focus the optical pulses and/or to redirect the generated optical pulses through the window of the housing to the front surface of the target foil. The optical pulses pierce the target foil and interact with the first transition layer, creating a plasma of electrons and positive ions. In some embodiments, the laser system is operable to adjust at least one of an intensity, timing, frequency, and amplitude of the optical pulses to produce a desired level of ionization of atoms of the first transition layer. Given the large ion-to-electron ratio, which is 1836 for protons, the electrons traverse through the first transition metal layer and travel a few micro-meters through a vacuum that separates the target foil from the second transition metal layer, leaving the positive ions along the back surface of the first transition metal layer. The foregoing process creates a high intensity electric field due to a charge separation mechanism described herein and sometimes referred to as target normal sheath acceleration ("TNSA"). The high intensity electric field created by TNSA is then utilized to accelerate deuterium D+ and/or tritium T+ ions from the first transition metal layer, across the vacuum, and to the front surface of the second transition metal layer. The deuterium D+ and/or the tritium T+ ions interact with the deuterium D+ and/or tritium T+ ions that are doped along the front surface of the second transition metal layer to initiate fusion reactions.

In some embodiments, the fusion reactions are between deuterium D+ and deuterium D+ ions. In one of such embodiments, the downhole neutron generator is operable to generate neutrons of approximately 2.5 MeV of energy based on the foregoing neutron reactions. In other embodiments, the fusion reactions are between tritium T+ and tritium T+ ions. In one of such embodiments, the downhole neutron generator is operable to generate neutrons in the 0-10 MeV of energy based on the foregoing neutron reactions. In further embodiments, the fusion reactions are between deuterium D+ and the tritium T+ ions. In one of such embodiments, the downhole neutron generator is operable to generate approximately $10^9$ neutrons per second of 14.1 MeV of energy based on the foregoing neutron reactions. In some embodiments, the outer diameter of the downhole neutron generator is less than or equal to 1.5 inches and the length of the downhole neutron generator is less than 7 inches long. These dimensions are significantly smaller than the dimensions of the UHV unit as well as downhole neutron generators that utilize an UHV unit, which reduces the overall cost of the downhole neutron generators disclosed herein. Further, it is also much more feasible to deploy neutron generators disclosed herein in different sections of a well having different dimensions relative to downhole neutron generators that utilize an UHV unit. Additional details of the foregoing downhole neutron generator, method to generate neutrons in a downhole environment, and methods to log formation data information are provided in the paragraphs below and are illustrated in at least FIGS. 1-5.

Figure 1A:
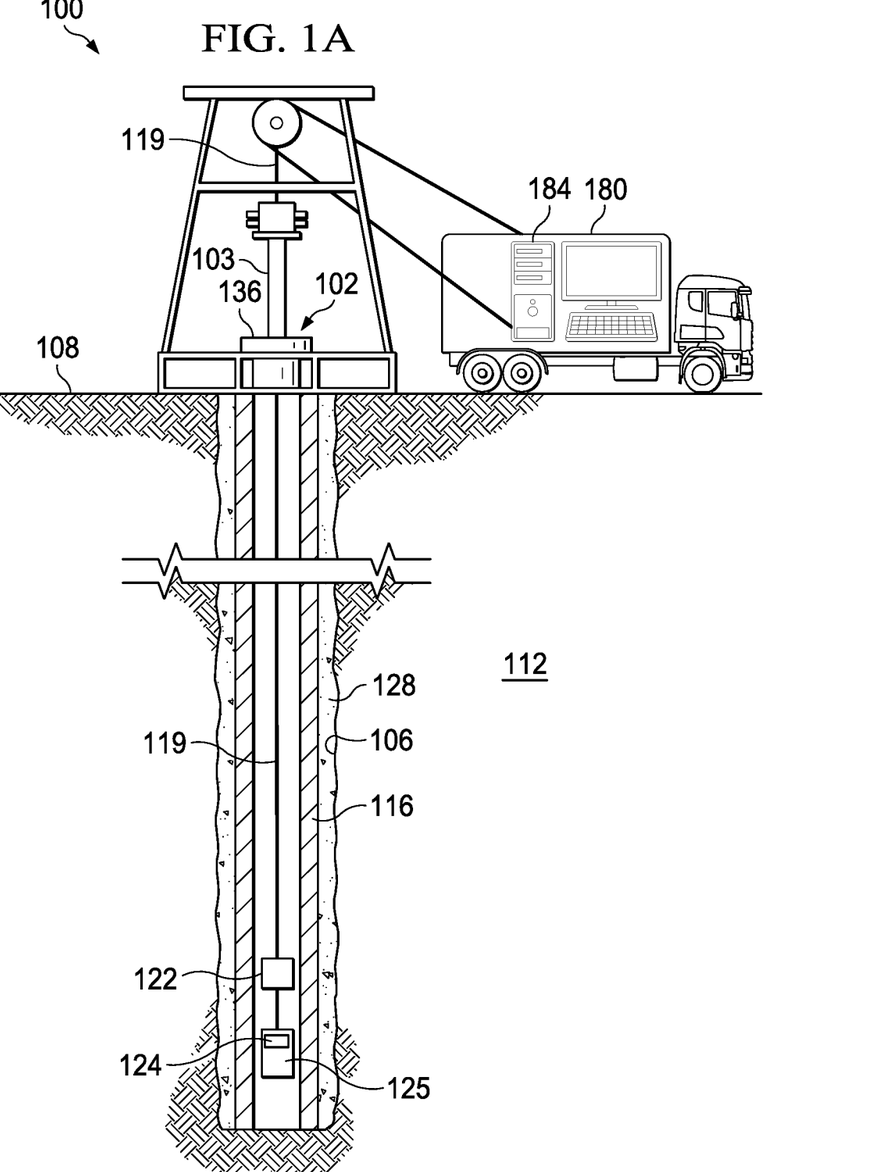
FIG. 1A illustrates a schematic view of a wireline logging environment in which a downhole neutron generator is deployed on a wireline in an annulus of a casing.

Now turning to the figures, FIG. 1A illustrates a schematic view of a wireline logging environment 100 in which a downhole neutron generator 122 is deployed on a wireline 119 in wellbore 106. As stated herein, the downhole neutron generator 122 includes a laser system and a housing, which contains a target foil having a first transition metal layer deposited along the back surface of the target foil, a heating element operable to heat the first transition metal, and a second transition metal layer housed within the housing. Additional discussions of various components of the downhole neutron generator 122 are provided in the paragraphs below and are illustrated in at least FIGS. 2-5.

In the embodiment of FIG. 1A, a well having the wellbore 106 extends from a surface 108 of the well 102 to or through a subterranean formation 112. A casing 116 is deployed along the wellbore 106 to insulate downhole tools and strings deployed in the casing 116, to provide a path for hydrocarbon resources flowing from the subterranean formation 112, to prevent cave-ins, and/or to prevent contamination of the subterranean formation 112. The casing 116 is normally surrounded by a cement sheath 128, which is deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A vehicle 180 carrying controller 184 and the wireline is positioned proximate to the well 102. The wireline 119 along with the downhole neutron generator 122 and a logging tool 125 having a sensor 124 are lowered through the blowout preventer 103 into the well 102. Data indicative of measurements obtained by the logging tool 125 may be transmitted via the wireline 119 or via another telemetry system to the surface 108 for processing by controller 184 or by another electronic device operable to process data obtained by the logging tool 125. The controller 184 may include any electronic and/or optoelectronic device operable to receive data and/or process data indicative of one or more formation properties to determine the formation properties. In the embodiment of FIG. 1A, the controller 184 is stored on the vehicle 180. In some embodiments, the controller 184 may also be housed in a temporary and/or permanent facility (not shown) proximate to the well 102. In other embodiments, the controller 184 may also be deployed at a remote location relative to the well 102. Additional operations of the controller 184 are provided in the paragraphs below. In some embodiments, the controller 184 includes a storage medium containing instructions on how to process signals indicative of the formation properties to determine formation properties and a processor operable to execute the instructions to determine the formation properties. In further embodiments, signals transmitted along the wireline 119 are relayed by another device or telemetry system to the controller 184. In some embodiments, the controller 184, the downhole neutron generator 122, and the sensor 124 are components of a downhole neutron generating system deployed at the well 102.

Figure 1B:
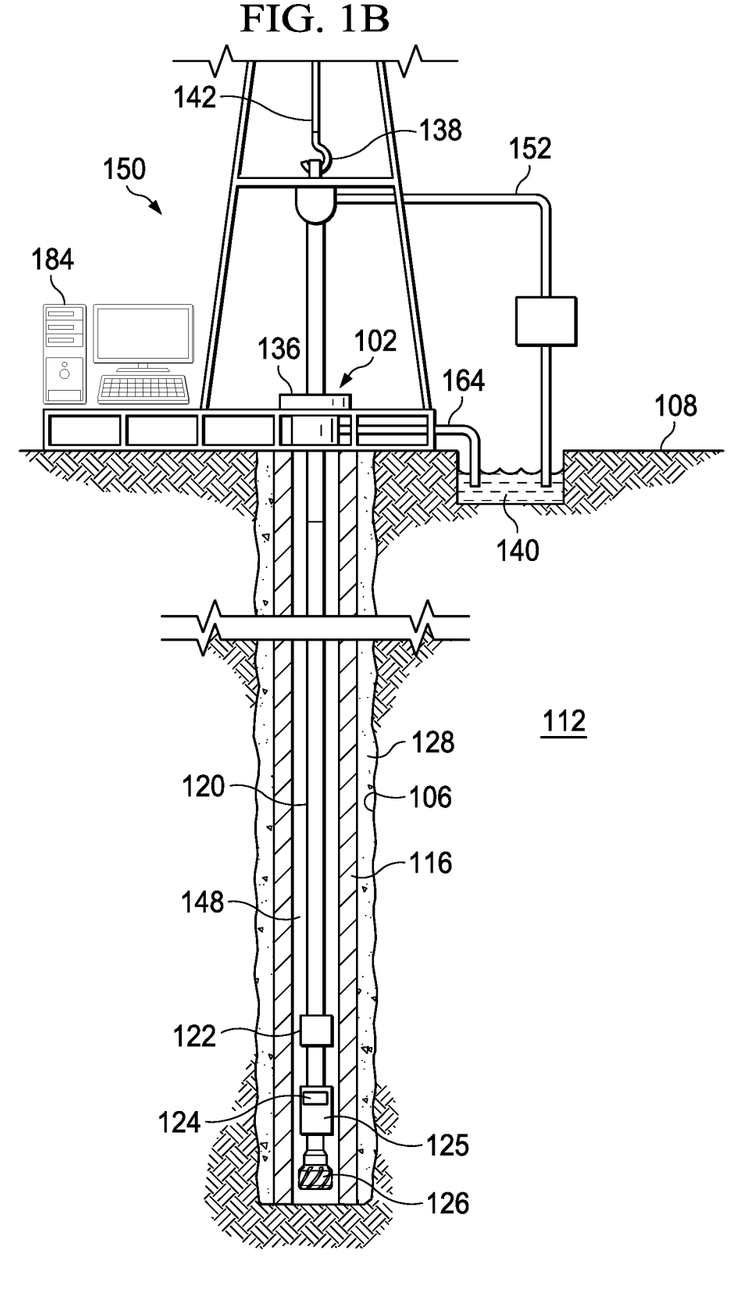
FIG. 1B illustrates a schematic view of a logging while drilling environment in which the downhole neutron generator of FIG. 1A is deployed in an annulus of the casing.

FIG. 1B is a schematic, side view of a logging while drilling (LWD) environment 150 in which the downhole neutron generator 122 of FIG. 1A is deployed in the wellbore 106 to detect leaks long the wellbore 106. In the embodiment of FIG. 1B, a hook 138, cable 142, traveling block (not shown), and hoist (not shown) are provided to lower a tool string 120 down the wellbore 106 or to lift the tool string 120 up from the wellbore 106. The tool string 120 may be a drill string, or another type of tool string operable to deploy the downhole neutron generator 122. At wellhead 136, an inlet conduit 152 is coupled to a fluid source (not shown) to provide fluids, such as drilling fluids, downhole. The tool string 120 has an internal annulus that provides a fluid flow path from the surface 108 down to drill bit 126. The tool string 120 is coupled to the downhole neutron generator 122 and the logging tool 125, which in the embodiment of FIG. 1B, includes the sensor 124. The fluids travel down the tool string 120, and exit the tool string 120 at the drill bit 126. The fluids flow back towards the surface 108 through a wellbore annulus 148 and exit the wellbore annulus 148 via an outlet conduit 164 where the fluids are captured in a container 140.

Once the downhole neutron generator 122 is lowered to a desired location, the fusion reaction disclosed herein may be initiated at an operator's discretion or may be terminated. More particularly, optical pulses generated by the laser source component of the downhole neutron generator 122 ionize the front surface of the first transition metal layer and create a plasma of electrons and positive ions. A high intensity electric field is created due to TNSA. The propagation of electrons created by an intense beam of optical pulses across a thin solid target is governed by the Lorentz force and may be expressed by the following equation:

$$F = \frac{d\vec{p}}{dt} = m_e \frac{d\vec{v}}{dt} = -e(\vec{E} + \vec{v} \times \vec{B})$$ EQ. 2 where $\vec{p}$ is the electron's momentum, $\vec{v}$ its velocity, $m_e$ the electron's rest mass, e is the elementary charge, and $\vec{E}=E_0 \cos(kz-wt)\hat{x}$, and $\vec{B}=B_0 \cos(kz-wt)\hat{y}$ represent the time dependent electric and magnetic fields. For a case of non-relativistic electrons, EQ. 2 may be approximated by the following equation:

$$F = m_e a = m_e \omega^2 z = -eE \Rightarrow z = \frac{eE}{m_e \omega^2}$$ EQ. 3 where the $\vec{v} \times \vec{B}$ term has been neglected due to vB=vE/c□ 1 for v□ c. In some embodiments, the energy of an oscillating electron may then be obtained by the following equation:

$$U_p = \left\langle \frac{1}{2} m_e (\omega z)^2 \right\rangle = \frac{1}{2} m_e \omega^2 \left( \frac{eE}{m_e \omega^2} \right)^2 = \frac{e^2 E_0^2}{4 m_e \omega^2}$$ EQ. 4 where the energy expressed by EQ. 4 is the Ponderomotive energy and the force associated with it may be expressed by the following equation:

$$F_p = \frac{d}{dz}\left( -\frac{e^2 E^2}{4 m_e \omega^2} \right) = -\frac{e^2}{4 m_e \omega^2} \nabla E^2$$ EQ. 5

Further, the intensity of an EM wave may be expressed as the following:

$$I = \frac{1}{2} \varepsilon_0 c E^2$$ EQ.6

By applying EQ.6, the Ponderomotive energy may also be expressed in terms of the laser's intensity and wavelength as the following:

$$U_P[eV] = \frac{e^2 E_0^2}{4 m_e^2 \omega^2} = \frac{e^2}{8\pi^2 m_e^2 \varepsilon_0 c^5} I\lambda^2 \square 9.34 \cdot 10^{-14} I[Wcm^{-2}](\lambda[\mu m])^2$$ EQ. 7

By applying EQ.3, the velocity may be expressed as the following:

$$v = \omega z = \frac{eE}{m_e \omega}$$ EQ. 8

The normalized momentum may be expressed as the following:

$$\vec{a} = \frac{\vec{p}}{m_e c} = \frac{\vec{v}}{c} = \frac{e\vec{E}}{m_e \omega c}$$ EQ. 9 and may be defined from where the following equation may be derived.

$$a^2 = \frac{E_0^2}{2} \frac{e^2}{m_e^2 \omega^2 c^2} = \frac{a_0^2}{2}$$ EQ. 10

For a case of relativistic electrons where $\vec{v} \times \vec{B}$ term of relativistic electrons may not be ignored, the electron motion may be described by EQs. 11 and 12 where $$\gamma = \left(1 - \frac{v^2}{c^2}\right)^{-\frac{1}{2}}$$

is a relativistic factor:

$$m = m_0 \gamma \Rightarrow m_0^2 c^2 = m^2 c^2 - m^2 v^2 \qquad \text{EQ. 11}$$

$$\frac{m_0^2 c^2}{m_0^2 c^2} =$$

$$\frac{m^2 c^2}{m_0^2 c^2} - \frac{m^2 v^2}{m_0^2 c^2} \Rightarrow 1 = \frac{m^2}{m_0^2} - \frac{p^2}{m_0^2 c^2} \Rightarrow \gamma = \frac{m}{m_0} = \left(1 + \left(\frac{p}{m_0 c}\right)^2\right)^{\frac{1}{2}}$$

$$\gamma = \left(1 - \frac{v^2}{c^2}\right)^{-\frac{1}{2}} = \left(1 + \left(\frac{p}{m_e c}\right)^2\right)^{\frac{1}{2}} = \sqrt{1 + \frac{a_0^2}{2}} \qquad \text{EQ. 12}$$

Based on the foregoing, the laser intensity may then be written as the following:

$$I = \frac{a_0^2}{\lambda^2} \frac{c \varepsilon_0 m_e^2 \omega^2 c^2}{e^2} = \frac{a_0^2}{\lambda^2} \frac{\varepsilon_0 c \pi^2 m_e^2 c^2 c^2}{e^2} \square 0.685 \cdot 10^{18} \frac{a_0^2}{\lambda^2} \qquad \text{EQ. 13}$$

where the intensity of the optical pulses is expressed in $Wcm^{-2}$ and the wavelength in $\mu m$. Applying EQ.13, the Ponderomotive energy for the relativistic electrons can be expressed as the following:

$$U_{Prel}[MeV] = m_e c^2 (\gamma - 1) = 0.511 \left(\sqrt{1 + \frac{a_0^2}{2}} - 1\right) = \qquad \text{EQ. 14}$$

$$0.511 \left(\sqrt{1 + (1/0.685 \cdot 10^{18}) I[Wcm^{-2} \lambda^2 [\mu m]^2} - 1\right)$$

As an example, the accelerating energies that may be obtained by irradiating a target with typical CPA lasers, such as $CO_2$ laser beams of intensity $10^{18}$ $Wcm^{-12}$ is $U_p[eV]$ $\square 10.5$ MeV. In some embodiments, this intensity may be obtained by focusing a laser on a 1 $\mu m^2$ target having a peak power given by $P = I \cdot A = 10^{18}$ $Wcm^{-2} \cdot 1$ $\mu m^2 \square 10$ GW. This kind of peak power may be delivered by a laser system capable of producing ultra-short pulses of duration $0.1 \cdot 10^{-12}$ s at a repetition rate of 1 kHz resulting in $P_{laser} = 10^{10}$ $J \cdot s^{-1} \cdot 10^{-13}$ $s \cdot 10^3$ $s^{-1} = 1$ W.

As stated herein, the TNSA mechanism may be utilized to accelerate ions to energies in the tens of MeV range, thereby permitting the downhole neutron generator discussed herein to not only initiate deuterium and tritium neutron fusion reactions, but also initiate deuterium and deuterium neutron fusion reactions and tritium and tritium neutron fusion reactions. Both deuterium and deuterium neutron fusion reactions and tritium and tritium neutron fusion reactions provide yields orders of magnitude lower than the yield of deuterium and tritium neutron fusion reactions permitted by conventional neutron generators utilized in downhole environments.

The fusion reactions in turn generate neutrons that traverse the surrounding subterranean formation 112. The sensor 124 component of the logging tool 125 is operable to measure return signals indicative of the formation properties. In some embodiments, the logging tool 125 is coupled to or is deployed proximate to the downhole neutron generator 122. In some embodiments, data indicative of the measured formation properties is stored in a local storage medium that is deployed at a downhole location proximate to the sensor 124. In other embodiments, the data is transmitted along the wireline 119 uphole, where the data is analyzed by controller 184 to determine the formation properties.

Although FIGS. 1A and 1B illustrate the downhole neutron generator 122 deployed in two exemplary environments, the downhole neutron generator 122 may be deployed in various drilling, completion, and production environments. Further, although the FIGS. 1A and 1B illustrate the downhole neutron generator 122 and the logging tool 125 as separate devices, in some embodiments, the downhole neutron generator 122 is a component of the logging tool 125.

Figure 2:
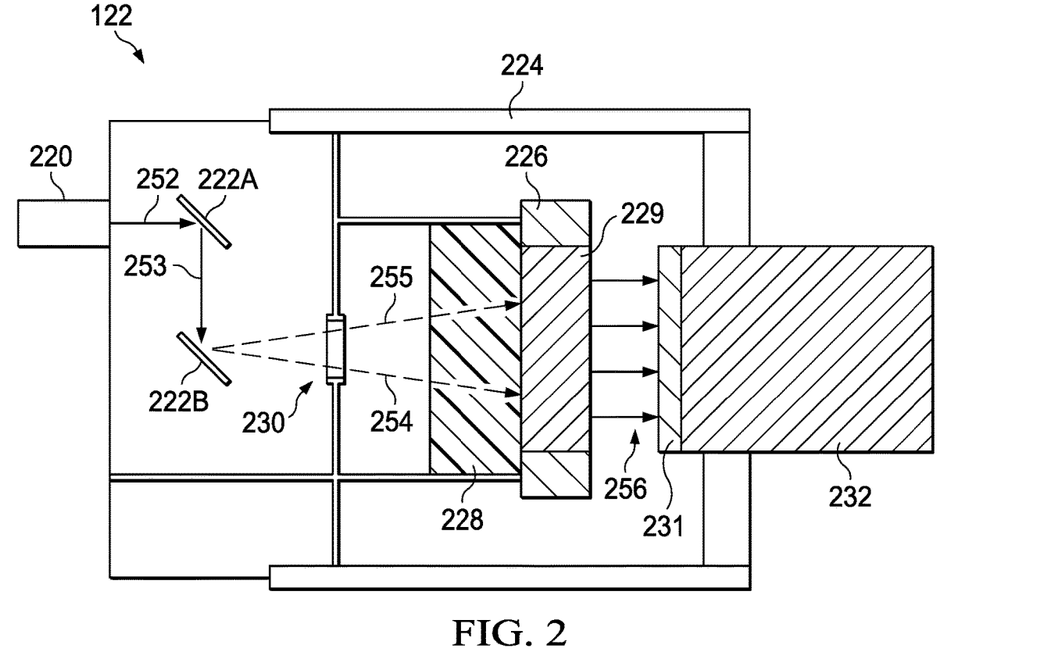
FIG. 2 illustrates a schematic view of the downhole neutron generator of FIG. 1A.

FIG. 2 illustrates a schematic view of the downhole neutron generator 122 of FIG. 1A. As shown in FIG. 2, the downhole neutron generator 122 includes a laser system, which includes laser source 220 and mirrors 222A and 222B. The downhole neutron generator 122 also includes a housing 224, which stores additional components of the downhole neutron generator 122 discussed herein utilized to initiate one or more types of fusion reactions to generate neutrons.

The housing 224 houses a heating element 226 and a target foil 228 having a first transition metal layer 229, such as titanium deposited along a back surface of the target foil 228. In some embodiments, the target foil 228 is a Mylar backing. In other embodiments, the target foil 228 is an aluminum backing. In further embodiments, the target foil 228 is a different backing operable to allow the first transition metal layer 229 to be deposited along the back surface of said backing. The housing 224 also houses the heating element 226, which is positioned proximate to the first transition metal layer 229. The heating element 226 may be constructed from any material operable to generate heat and to dissipate the generated heat to the first transition metal layer 229. In some embodiments, the heating element 226 includes a conductive material, such as a copper or a graphene electrical wire, which forms a flow path for electrical currents. In such embodiments, electrical currents flowing through the conductive material of the heating element 226 heat up the heating element 226. Heat is then dissipated and is absorbed by the first transition metal layer 229.

In the embodiment of FIG. 2, the heating element 226 wraps around the first transition metal layer 229 to facilitate heating the first transition metal layer 229. In other embodiments, the heating element 226 may have a different configuration to facilitate heating the first transition metal layer 229. In some embodiments, one or more conduits that provide a flow path for deuterium and/or tritium gases are coupled to the housing 224 to release the deuterium and/or tritium gases into the housing 224. The first transition metal layer 229 is operable to absorb nearby deuterium and/or tritium gases when the first transition metal layer 229 is heated above a threshold temperature. For example, if the first transition metal layer 229 is formed from titanium, the first transition metal layer 229 is operable to absorb an amount of nearby deuterium and/or tritium gases when the first transition metal layer 229 is heated to approximately 800° C. The housing 224 also houses a second transition metal layer 231 and a heatsink 232. The second transition metal layer 231 is separated from the first transition metal layer 229 by a vacuum space. Further, the second transition metal layer 231 is doped with deuterium D+ and/or tritium T+ ions, which are utilized to initiate nuclear fusion reactions. The heatsink 232 is positioned proximate to or is coupled to the second transition metal layer 231 to facilitate heat dissipation during nuclear fusion reactions. In some embodiments, the second transition metal layer 231 is also formed from titanium and the heatsink 232 is formed from copper.

The laser source 220 may be any optoelectronic device oriented and operable to generate beams of optical pulses and further oriented and operable to transmit the optical pulses towards the front surface of the target foil 228. As shown in FIG. 2, optical pulses generated by the laser source 220 travel in a direction indicated by arrow 252. The laser system also includes mirrors 222A and 222B. The mirrors 222A and 222B may be constructed from materials oriented and operable to focus, reflect, and/or redirect the optical pulses. As shown in FIG. 2, the optical pulses traveling in a direction indicated by arrow 252 are reflected by the mirror 222A to travel in a direction indicated by arrow 253, and are reflected by mirror 222B to travel in directions indicated by arrows 254 and 255.

The optical pulses traveling in directions indicated by arrows 254 and 255 penetrate a window 230 of the housing 224 to reach the first transition metal layer 229 and create a plasma of electrons and positive ions. The electrons traverse through the first transition metal layer 229, and travel a few micro-meters in a direction indicated by arrows 256 through the vacuum that separates the first transition metal layer 229 and the second transition metal layer 231, to reach a front surface of the second transition metal layer 231. A TNSA mechanism described herein is utilized to accelerate deuterium D+ and/or tritium T+ ions from the first transition metal layer 229 to the front surface of the second transition metal layer 231, where the transmitted deuterium D+ and/or the tritium T+ ions interact with the deuterium D+ and/or tritium T+ ions that are doped along the front surface of the second transition metal layer 231 to initiate fusion reactions. In some embodiments, the fusion reactions generate approximately $10^{10}$ neutrons per second of approximately 14.1 MeV of energy from the fusion reaction of deuterium D+ ions and tritium T+ ions. In other embodiments, the fusion reactions generate approximately $10^9$ neutrons per second of approximately 2.5 MeV of energy from the fusion reaction of deuterium D+ ions and deuterium D+ ions. In further embodiments, the fusion reactions generate approximately $10^9$ neutrons per second of 0-10 MeV of energy from the fusion reaction of tritium T+ ions and tritium T+ ions.

The downhole neutron generator 122 may be readily turned on and/or off by controlling the laser system. In some embodiments, the downhole neutron generator 122 has an on and off switch time of less than 1 microsecond. In some embodiments, the downhole neutron generator has an outer diameter of less than 1½ inches and a length of less than 7 inches. As such, the downhole neutron generator 122 may be easily deployed in an annulus of a casing and may be turned on during wireline logging operations, LWD operations, MWD operations, and/or other types of logging operations where the downhole neutron generator 122 may be deployed in the wellbore 106.

Figure 3:
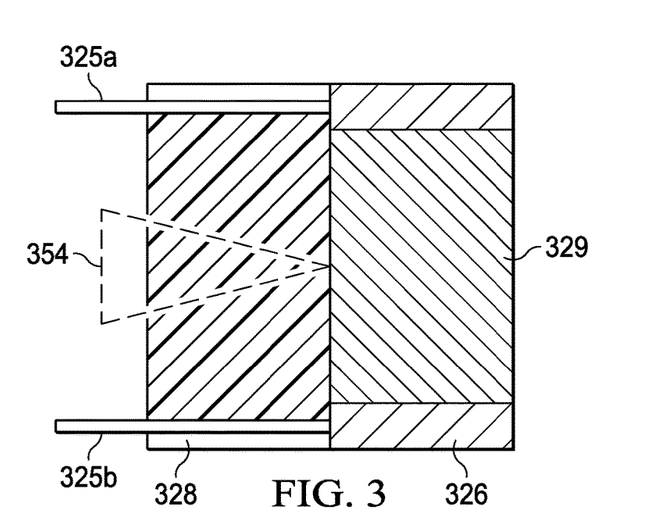
FIG. 3 illustrates a schematic view of a Mylar backing having a titanium layer deposited along the back surface of the Mylar backing.

FIG. 3 illustrates a schematic view of a Mylar backing 328 having a titanium layer 329 deposited along the back surface of the Mylar backing 328. Heating element 326 is wrapped around the titanium layer 329 and is coupled to first and second heating element electrodes 325A and 325B, where each of the heating element electrodes 325A and 325B provides a current flow path from a current source (not shown) to the heating element 326. As stated herein, current flowing through the heating element 326 generates heat, thereby heating up the heating element 326. Heat dissipated from the heating element 326 in turn heats up the titanium layer 329 to approximately 800° C., which allows the titanium layer 329 to absorb nearby deuterium and/or tritium gases. In some embodiments, the Mylar backing 328 is approximately 100-200 um thick and the titanium layer 329 is approximately 10-50 um thick. In other embodiments, the Mylar backing 328 and the titanium layer 329 have different thicknesses. Optical pulses represented by triangle 354 penetrate the Mylar backing 328 and interact with the titanium layer 329 to create a plasma of electrons and positive ions. As stated herein, the electrons traverse through the titanium layer 329 and travel a few micro-meters through a vacuum that separates the titanium layer 329 from a second transition metal layer, leaving the positive ions along the back surface of the first transition metal layer. A TNSA mechanism may be utilized to accelerate deuterium D+ and/or tritium T+ ions from the titanium layer 329, across the vacuum, and to the front surface of the second transition metal layer to initiate fusion reactions.

Figure 4:
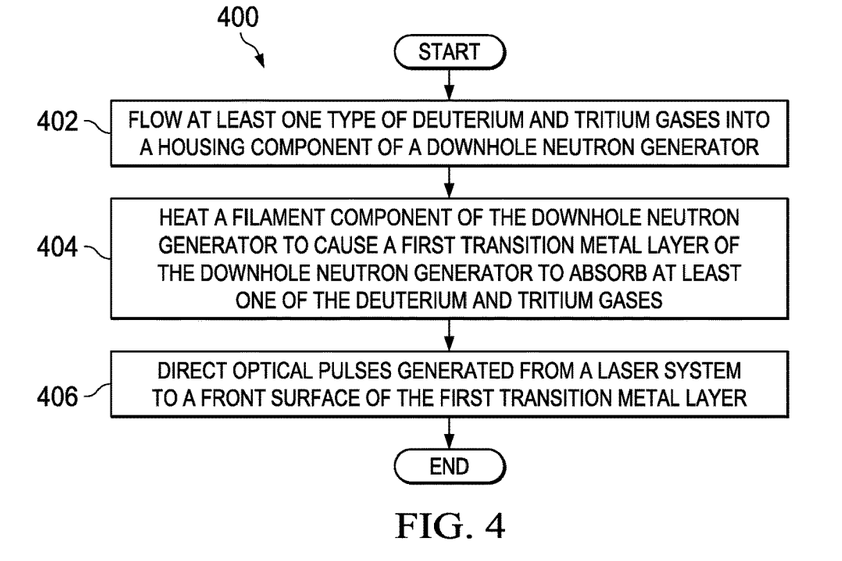
FIG. 4 illustrates a flow chart of a process to generate neutrons in a downhole environment.

FIG. 4 illustrates a flow chart of a process 400 to generate neutrons in a downhole environment. Although operations in the process 400 are shown in a particular sequence, certain operations may be performed in different sequences or at the same time where feasible. Further, although the operations in the process 400 are described to be performed by the downhole neutron generator 122, the operations may also be performed by other embodiments of a downhole neutron generator described herein.

At step 402, at least one type of deuterium and tritium gases are released from a gas chamber into the housing 224 of the downhole neutron generator 122. At step 404, the heating element 226 is heated to cause the first transition metal 229 to absorb an amount of the released deuterium and/or tritium gases. In some embodiments, where the first transition metal 229 is formed from titanium, the titanium is heated to around 800° C., which causes the titanium to absorb the released deuterium and/or tritium gases. At step 406, the laser source 220 generates optical pulses which are directed to the first transition metal layer 229. The optical pulses generated by the laser source 220 component of the downhole neutron generator 122 ionize the front surface of the first transition metal layer 229 and create a plasma of electrons and positive ions. A high intensity electric field is created due to TNSA and is utilized to accelerate deuterium D+ and/or tritium T+ ions from the first transition metal layer 229 to the front surface of the second transition metal layer 231, where the transmitted deuterium D+ and/or the tritium T+ ions interact with the deuterium D+ and/or tritium T+ ions that are doped on the second transition metal layer 231 to initiate one or more types of fusion reactions.

Figure 5:
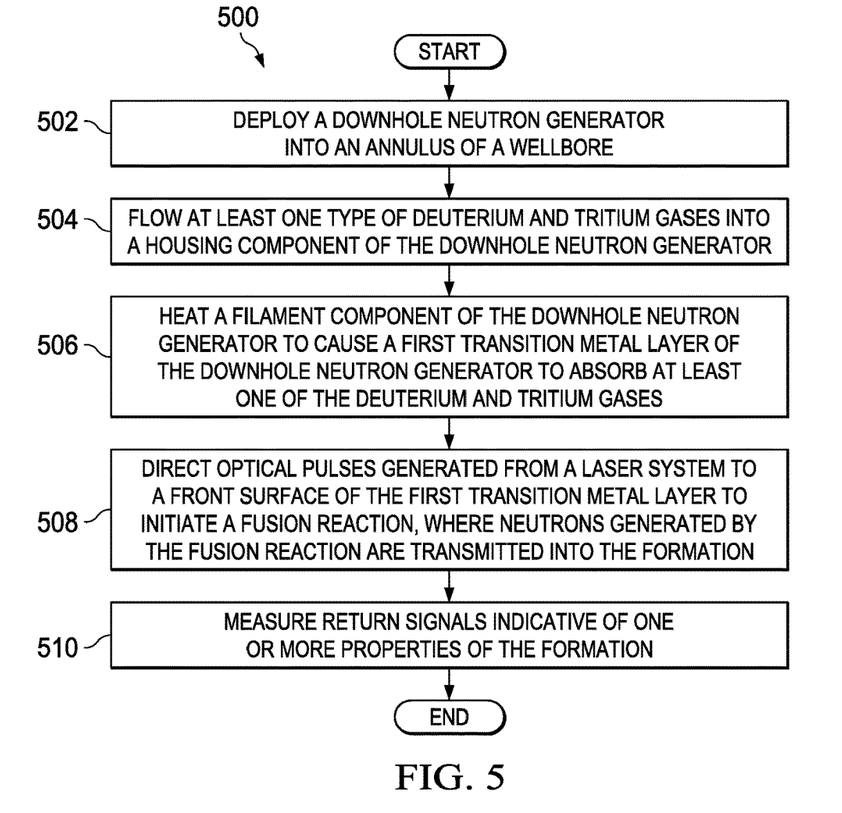
FIG. 5 illustrates a flow chart of a process to log data indicative of one or more formation properties of the surrounding formation.

FIG. 5 illustrates a flow chart of a process 500 to log data indicative of one or more formation properties of the surrounding formation. Although operations in the process 500 are shown in a particular sequence, certain operations may be performed in different sequences or at the same time where feasible. Further, although the operations in the process 500 are described to be performed by the downhole neutron generator 122, the operations may also be performed by other embodiments of a downhole neutron generator described herein.

At step 502, the downhole neutron generator 122 is deployed into an annulus of the wellbore 106. For example, in the embodiment illustrated in FIG. 1A, the downhole neutron generator 122 is deployed via the wireline 119 into an annulus of the casing 116 to a desired depth. At step 504, similar to step 402, at least one type of deuterium and tritium gases are released from a gas chamber into the housing 224 of the downhole neutron generator 122. At step 506, the heating element 226 is heated to cause the first transition metal 229 to absorb an amount of the released deuterium and/or tritium gases. At step 508, the laser source 220 generates optical pulses which are directed to the first transition metal layer 229 to initiate one or more types of fusion reactions described herein. In some embodiments, the fusion reactions generate approximately $10^{10}$ neutrons per second of approximately 14.1 MeV of energy from the fusion reaction of deuterium D+ ions and tritium T+ ions. In other embodiments, the fusion reactions generate approximately $10^9$ neutrons per second of approximately 2.5 MeV of energy from the fusion reaction of deuterium D+ ions and deuterium D+ ions. In further embodiments, the fusion reactions generate approximately $10^9$ neutrons per second of approximately 0-10 MeV of energy from the fusion reaction of tritium T+ ions and tritium T+ ions.

Neutrons generated from the fusion reactions are transmitted from the downhole neutron generator 122 into the subterranean formation 112. At step 510, the sensor 124 component of the logging tool 125 measures return signals indicative of the one or more properties of the subterranean formation 112. The logging tool 125 may store the measured properties of the subterranean formation 112 in a local storage medium and/or may transmit the properties of the subterranean formation 112 via the wireline 119 to the controller 184.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a downhole neutron generator comprising a heating element; a target foil positioned proximate to the heating element and having a first transition metal layer comprising at least one of deuterium and tritium isotopes absorbed by the first transition metal layer; a second transition metal layer separated from the target foil by a vacuum, where the second transition metal layer comprises at least one of deuterium D+ and tritium T+ ions; and a laser system oriented to direct optical pulses onto a front surface of the first transition metal layer to produce at least one deuterium of D+ and tritium T+ ions from at least one of the absorbed deuterium and tritium Clause 2, the downhole neutron generator of clause 1, wherein the target foil, the heating element, and the second transition metal layer are stored within a housing unit of the downhole neutron generator.

Clause 3, the downhole neutron generator of clause 1 or 2, wherein the laser system comprises one or more mirrors oriented to focus the optical pulses through a window of the housing to the target foil.

Clause 4, the downhole neutron generator of at least one of clauses 1-3, wherein the first transition metal layer is formed from titanium and has a thickness of approximately 10-50 um.

Clause 5, the downhole neutron generator of at least one of clauses 1-4, wherein the housing further comprises a heatsink coupled to the second transition metal layer and operable to absorb heat generated from the fusion reaction.

Clause 6, the downhole neutron generator of at least one of clauses 1-5, wherein an ultra-high voltage (UHV) section is not utilized to produce neutrons from the fusion reaction.

Clause 7, the downhole neutron generator of at least one of clauses 1-6, wherein the downhole neutron generator has an on and off switching time of lower than 1 micro second.

Clause 8, the downhole neutron generator of at least one of clauses 1-7, wherein the downhole neutron generator is operable to fit within an annulus of a casing.

Clause 9, the downhole neutron generator of at least one of clauses 1-8, wherein the downhole neutron generator has an outer diameter less than 1½ inches and a length of less than 7 inches.

Clause 10, a method to generate neutrons in a downhole environment, comprising flowing at least one type of deuterium and tritium gases in a housing of a downhole neutron generator, wherein the housing houses a target foil having a first transition metal layer, a heating element operable to dissipate heat to the first transition metal layer, and a second transition metal layer, wherein the second transition metal layer and the target foil are separated, and wherein the second transition metal layer comprises at least one of deuterium D+ and tritium T+ ions; heating the heating element of a downhole neutron generator to cause the first transition metal layer to absorb an amount of at least one of deuterium and tritium gases flowing proximate to the first transition metal layer; and directing optical pulses generated from a laser system to a front surface of the first transition metal layer to initiate a fusion reaction.

Clause 11, the method of clause 10, wherein heating the heating element further comprises flowing a current through the heating element to heat the first transition metal layer to a temperature determined by an equation, wherein the equation is $P=A \cdot Q^2 \cdot e^{-E/RT}$, wherein P is an equilibrium pressure, A is a constant, Q is a concentration, E is an absorption energy, R is a gas constant, and T is a threshold temperature.

Clause 12, the method of clause 10 or 11, wherein initiating the fusion reaction comprises initiating at least one of a fusion reaction between at least one of deuterium D+ ions and tritium T+ ions, deuterium D+ ions and tritium T+ ions, and tritium T+ ions and tritium T+ ions.

Clause 13, the method of at least one of clauses 10-12, wherein initiating the fusion reaction comprises initiating a reaction between deuterium D+ and tritium T+ ions to generate $10^{10}$ neutrons per second of 14.1 Mev of energy.

Clause 14, the method of at least one of clauses 10-13, wherein initiating the fusion reaction comprises initiating a reaction between deuterium D+ ions and deuterium D+ ions to generate approximately $10^9$ neutrons per second of 2.5 MeV of energy.

Clause 15, the method of at least one of clauses 10-14, wherein initiating the fusion reaction comprises initiating a reaction between tritium T+ ions and tritium T+ ions to generate approximately $10^9$ neutrons per second of 0-10 MeV of energy.

Clause 16, a method to log a formation, comprising deploying a downhole neutron generator into an annulus of a wellbore; flowing at least one of deuterium and tritium gases in a housing of the downhole neutron generator, wherein the housing houses a target foil having a first transition metal layer, a heating element operable to dissipate heat to the first transition metal layer, and a second transition metal layer, wherein the second transition metal layer and the target foil are separated, and wherein the second transition metal layer is doped with at least one of deuterium D+ and tritium T+ ions; heating the heating element of a downhole neutron generator cause the first transition metal layer to absorb an amount of at least one of deuterium and tritium gases flowing proximate to the first transition metal layer; directing optical pulses generated from a laser system to a front surface of the first transition metal layer to initiate a fusion reaction, wherein neutrons generated by the fusion reaction are transmitted into the formation; and measuring return signals indicative of one or more properties of the formation.

Clause 17, the method of clause 16, wherein initiating the fusion reaction comprises initiating at least one of a fusion reaction between at least one of deuterium D+ ions and tritium T+ ions, deuterium D+ ions and tritium T+ ions, and tritium T+ ions and tritium T+ ions.

Clause 18, the method of clause 16 or 17 wherein initiating the fusion reaction comprises initiating a reaction between deuterium D+ and tritium T+ ions to generate approximately $10^{10}$ neutrons per second of 14. MeV of energy.

Clause 19, method of clause at least one of clauses 16-18, wherein initiating the fusion reaction comprises initiating a reaction between deuterium D+ ions and deuterium D+ions to generate approximately $10^9$ neutrons per second of 2.5 MeV of energy.

Clause 20, the method of at least one of clauses 16-19, wherein initiating the fusion reaction comprises initiating a reaction between tritium T+ ions and tritium T+ ions to generate approximately $10^9$ neutrons per second of 0-10 MeV of energy.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. A downhole neutron generator comprising:
    a heating element;
    a target foil positioned proximate to the heating element and having a first transition metal layer comprising at least one of deuterium and tritium absorbed by the first transition metal layer;
    a second transition metal layer separated from the target foil by a vacuum, where the second transition metal layer comprises at least one of deuterium D+ and tritium T+ ions; and
    a laser system oriented to direct optical pulses onto a front surface of the first transition metal layer to produce at least one deuterium of D+ and tritium T+ ions from at least one of the absorbed deuterium and tritium, wherein the downhole neutron generator is deployed in an annulus of a wellbore.

2. The downhole neutron generator of claim 1, wherein the target foil, the heating element, and the second transition metal layer are stored within a housing unit of the downhole neutron generator.

3. The downhole neutron generator of claim 2, wherein the laser system comprises one or more mirrors oriented to focus the optical pulses through a window of the housing to the target foil.

4. The downhole neutron generator of claim 2 wherein the first transition metal layer is formed from titanium and has a thickness of approximately 10-50 um.

5. The downhole neutron generator of claim 2, wherein the housing further comprises a heatsink coupled to the second transition metal layer.

6. The downhole neutron generator of claim 1, wherein an ultra-high voltage (UHV) section is not utilized to produce neutrons from a fusion reaction.

7. The downhole neutron generator of claim 1, wherein the downhole neutron generator has an on and off switching time of lower than 1 micro second.

8. The downhole neutron generator of claim 1, wherein the downhole neutron generator is operable to fit within an annulus of a production casing.

9. The downhole neutron generator of claim 1, wherein the downhole neutron generator has an outer diameter less than 1½ inches and a length of less than 7 inches.

10. A method to generate neutrons in a downhole environment, comprising:
    flowing at least one type of deuterium and tritium gases in a housing of a downhole neutron generator that is deployed in an annulus of a wellbore, wherein the housing houses a target foil having a first transition metal layer, a heating element operable to dissipate heat to the first transition metal layer, and a second transition metal layer, wherein the second transition metal layer and the target foil are separated, and wherein the second transition metal layer comprises at least one of deuterium D+ and tritium T+ ions;
    heating the heating element of the downhole neutron generator above to cause the first transition metal layer to absorb an amount of at least one of deuterium and tritium gases flowing proximate to the first transition metal layer; and
    directing optical pulses generated from a laser system to a front surface of the first transition metal layer to initiate a fusion reaction.

11. The method of claim 10, wherein heating the heating element further comprises flowing a current through the heating element to heat the first transition metal layer to a temperature determined by wherein is an equilibrium pressure, is a constant, is a concentration, is an absorption energy, is a gas constant, and is a threshold temperature.

12. The method of claim 10, wherein initiating the fusion reaction comprises initiating at least one of a fusion reaction between at least one of deuterium D+ ions and tritium T+ ions, deuterium D+ ions and deuterium D+ ions, and tritium T+ ions and tritium T+ ions.

13. The method of claim 12, wherein initiating the fusion reaction comprises initiating a reaction between deuterium D+ and tritium T+ ions to generate 1010 neutrons per second of 14.1 Mev of energy.

14. The method of claim 12, wherein initiating the fusion reaction comprises initiating a reaction between deuterium D+ ions and deuterium D+ ions to generate approximately 109 neutrons per second of 2.5 MeV of energy.

15. The method of claim 12, wherein initiating the fusion reaction comprises initiating a reaction between tritium T+ ions and tritium T+ ions to generate approximately 109 neutrons per second of 0-10 MeV of energy.

16. A method to log a formation, comprising:
deploying a downhole neutron generator into an annulus of a wellbore;
flowing at least one of deuterium and tritium gases in a housing of the downhole neutron generator, wherein the housing houses a target foil having a first transition metal layer, a heating element operable to dissipate heat to the first transition metal layer, and a second transition metal layer, wherein the second transition metal layer and the target foil are separated, and wherein the second transition metal layer comprises with at least one of deuterium D+ and tritium T+ ions;
heating the heating element of a downhole neutron generator to cause the first transition metal layer to absorb an amount of at least one of deuterium and tritium gases flowing proximate to the first transition metal layer;
directing optical pulses generated from a laser system to a front surface of the first transition metal layer to initiate a fusion reaction, wherein neutrons generated by the fusion reaction are transmitted into the formation; and
measuring return signals indicative of one or more properties of the formation.

17. The method of claim 16, wherein initiating the fusion reaction comprises initiating at least one of a fusion reaction between at least one of deuterium D+ ions and tritium T+ ions, deuterium D+ ions and deuterium D+ ions, and tritium T+ ions and tritium T+ ions.

18. The method of claim 17, wherein initiating the fusion reaction comprises initiating a reaction between deuterium D+ and tritium T+ ions to generate 1010 neutrons per second of 14.1 Mev of energy.

19. The method of claim 17, wherein initiating the fusion reaction comprises initiating a reaction between deuterium D+ ions and deuterium D+ ions to generate approximately 109 neutrons per second of 2.5 MeV of energy.

20. The method of claim 17, wherein initiating the fusion reaction comprises initiating a reaction between tritium T+ ions and tritium T+ ions to generate approximately 109 neutrons per second of 0-10 MeV of energy.

* * * * *